United States Patent [19]

Matsumoto et al.

[11] Patent Number: 5,206,327

[45] Date of Patent: Apr. 27, 1993

[54] PRECERAMIC POLYMERS INCORPORATING BORON AND THEIR APPLICATION IN THE SINTERING OF CARBIDE CERAMICS

[75] Inventors: Roger L. K. Matsumoto, Newark; Joanne M. Schwark, Wilmington, both of Del.

[73] Assignee: Hercules Incorporated, Wilmington, Del.

[21] Appl. No.: 772,524

[22] Filed: Oct. 7, 1991

[51] Int. Cl.$^5$ ............................................. C08G 79/08
[52] U.S. Cl. .................................................. 528/4
[58] Field of Search ........................................ 528/4

[56] References Cited

U.S. PATENT DOCUMENTS

| | | | |
|---|---|---|---|
| 4,041,117 | 8/1977 | Prochazka | 264/63 |
| 4,108,929 | 8/1978 | Prochazka et al. | 264/29 |
| 4,283,376 | 8/1981 | Yajima et al. | 423/345 |
| 4,482,689 | 11/1984 | Haluska | 528/25 |
| 4,668,642 | 5/1987 | Bujalski | 501/88 |
| 4,767,728 | 8/1988 | Riccitiello et al. | 501/91 |
| 4,851,491 | 7/1989 | Riccitiello et al. | 528/4 |
| 4,906,763 | 3/1990 | Paciorek et al. | 556/403 |
| 4,910,173 | 3/1990 | Niebylski | 501/97 |
| 4,921,925 | 5/1990 | Niebylski | 528/5 |
| 4,962,069 | 10/1990 | Burns et al. | 501/90 |
| 4,987,201 | 1/1991 | Riccitiello et al. | 528/4 |
| 5,045,399 | 9/1991 | Niebylski | 528/4 |

OTHER PUBLICATIONS

Seyferth and Plenio (J. Am. Ceram. Soc., 1990, 73(7), 2131-33) titled: Borasilazane Polymeric Precursors for Borosilicon Nitride.

*Primary Examiner*—Paul R. Michl
*Assistant Examiner*—Peter Szekely
*Attorney, Agent, or Firm*—Sandler, Greenblum & Bernstein

[57] ABSTRACT

The present invention relates to preceramic polymers incorporating boron and their application in the sintering of SiC ceramics. The present invention is also directed to a process for preparing a boron-substituted polysilazane which involves preparing a silazane ammonolysis product by reacting ammonia with a halogenated silicon compound selected from the group consisting of $RSiX_3$, $RR'SiX_2$, $RR'R''SiX$, $SiX_4$ and mixtures thereof, wherein X is selected from the group consisting of Cl, Br and I; and R, R' and R'' are the same or different and are selected from the group consisting of H, substituted or unsubstituted 1-6 carbon alkyl groups, aryl groups, 2-6 carbon alkenyl groups and 2-6 carbon alkynyl groups, wherein at least one of the halogenated silicon compounds may comprise at least one member selected from the group consisting of alkenyl groups and alkynyl groups; and reacting the silazane ammonolysis product with a borane containing at least one B—H group per molecule under conditions and for a time sufficient to form a boron-substituted polysilazane containing boron-carbon bonds.

33 Claims, No Drawings

PRECERAMIC POLYMERS INCORPORATING BORON AND THEIR APPLICATION IN THE SINTERING OF CARBIDE CERAMICS

FIELD OF THE INVENTION

The present invention relates to preceramic polymers incorporating boron and their application in the sintering of silicon carbide ceramics. More specifically, the present invention is directed to compositions comprising boron-substituted polysilazane wherein the boron is bound to the polysilazane through boron-carbon bonds, and particularly such compositions which are cross-linked, and processes for preparing the same. The present invention also relates to forming amorphous boron-containing char by subjecting the previously described compositions to pyrolysis. The char includes the carbon, silicon, and nitrogen, wherein boron is uniformly distributed throughout the char and is bonded to the carbon.

2. DISCUSSION OF BACKGROUND INFORMATION

Polysilazanes with silicon-nitrogen-carbon compositions have been developed and their utility as precursors to silicon nitride-containing ceramic materials have been disclosed in U.S. Pat. No. 4,482,669; U.S. Pat. No. 3,853,567; U.S. Pat. No. 4,689,252; U.S. Pat. No. 4,612,383; U.S. Pat. No. 4,675,424; U.S. Pat. No. 4,722,988; and U.S. Pat. No. 4,937,304.

In addition, some polysilazanes have been shown to be, under specific conditions, precursors to silicon carbide-containing ceramic materials (Matsumoto, R.L.K. *Mat. Res. Soc. Symp. Proc.*, Vol. 180, p. 797).

European Patent Application 89 300563.7, L.M. Niebylski, discloses a preceramic polymer consisting of a silicon nitrogen backbone bonded with boron and oxygen used to coat carbon/carbon composites. In European Patent Application 89 300563.7, the silazane polymer is reacted with a boroxine.

U.S. Pat. No. 4,668,642, D.R. Bujalski, discloses a method to increase the ceramic yield of $R_3SiNH$-containing silazane polymers by mixing with boron compounds before pyrolysis. Suitable boron compounds disclosed in U.S. Pat. No. 4,668,642 include, among others, elemental boron, metaboric acid, orthoboric acid and organoboron compounds of the general formula $BR_3''$ in which $R''$ may be an alkyl, aryl or alkoxy substituent. In this case, the inorganic boron compounds are simply admixed with the silazane polymer and do not react until the material is pyrolyzed.

U.S. Pat. No. 4,482,689, L.A. Haluska, relates to a metallosilazane polymer containing boron which can be converted to a ceramic by pyrolyzing at temperatures above 750° C., and is more specifically directed to a method for preparing a polymetallo(disilyl)silazane polymer that can be used in the formation of a ceramic material. The metallosilazane polymers containing boron are prepared by the reaction of a silazane with a mixture of chlorine-containing disilanes and a boron halide to produce boron-nitrogen bonds.

Seyferth and Plenio (*J. Am. Ceram. Soc.*, 1990, 73(7), 2131–33) describe the preparation of borasilazane polymeric precursors for borosilicon nitride prepared by the reaction of a polysilazane, $(CH_3SiHNH)_x$, with borane-dimethylsulfide adduct to give a polymer with boron-nitrogen bonds.

Other boron-substituted, silicon-based preceramic polymers have been disclosed. These contain no nitrogen in the polymer backbone, and are generally polysilane- or polycarbosilane-based.

U.S. Pat. No. 4,283,376, Yajima et al., relates to production of silicon carbide fibers from a polycarbosilane containing boron in its side chain. The fibers are made infusible and fired in a vacuum or in an inert atmosphere. Yajima et al. thus teach a process for producing polycarbosilanes that, in part, contain siloxane bonds by the addition of polyborosiloxane.

U.S. Pat. No. 4,851,491, Riccitiello et al., discloses a polyorganoborosilane ceramic precursor polymer comprising a plurality of repeat units of boron bonded to silicon; the polyorganoborosilanes are useful in the preparation of $SiC$, $SiB_4$, and $B_4C$.

U.S. Pat. No. 4,962,069, G.T. Burns et al., discloses a method to prepare a sintered silicon carbide body with a metal powder sintering aid and a preceramic polymer which forms a set amount of free carbon upon pyrolysis. In U.S. Pat. No. 4,962,069 the polysilazane precursors are used as a source of free carbon, and the sintering aid, i.e., boron or boron carbide, is added as a metal or ceramic powder.

U.S. Pat. No. 4,987,201, S.R. Riccitiello et al., discloses organoborosilicon preceramic polymers containing a silicon-carbon-boron backbone. These polymers are prepared by the hydroboration of monomeric vinyl- or acetylene-substituted alkylsilanes with aminoborane complexes or diborane. The silicon in the polymers disclosed in U.S. Pat. No. 4,987,201 may only be alkyl- or aryl-substituted and the boranes must contain only hydrogen substituents; also, the polymers described in U.S. Pat. No. 4,987,201 are boron-containing polycarbosilanes.

U.S. Pat. No. 4,041,117, S. Prochazka, discloses the preparation of a sintered silicon carbide body in which the boron, boron carbide or carbonaceous materials are used as sintering aids.

U.S. Pat. No. 4,108,929 S. Prochazka, discloses the preparation of a densified silicon carbide body by hot pressing a mixture of SiC with sintering aids, such as boron, boron carbide, or carbonaceous materials.

U.S. Pat. No. 4,962,069 G.T. Burns et al., discloses a method to prepare a sintered silicon carbide body with a metal powder sintering aid and a preceramic polymer which forms a set amount of free carbon upon pyrolysis. In U.S. Pat. No. 4,962,069, the polysilazane precursors are used as a source of free carbon, and the sintering aid, i.e., elemental boron or boron carbide is added as a powder.

Silicon carbide is a structural ceramic with good high temperature properties. Like other covalently bonded ceramics, such as silicon nitride, silicon carbide must be sintered with the addition of sintering aids. Sintering aids help to form a coherent bonded mass by mechanisms such as the formation of liquid phases or by enhancing solid state diffusion through the bulk or on the surface of the powdered particles. Unlike silicon nitride, which must be sintered via liquid phase sintering due to the decompositions which occur at about 1800° C., silicon carbide is sintered via surface diffusion at 2100° C. Silicon nitride, therefore, has poor high temperature properties due to the glassy intergranular phase. Silicon carbide, in contrast, maintains its properties to high temperature without degradation because there is no intergranular glassy phase which can soften. While it is possible to sinter silicon carbide via liquid phase sintering, the result would not be a useful high temperature ceramic.

Silicon carbide is currently sintered with boron and carbon, or aluminum and carbon additives. These additives increase the surface diffusion of silicon carbide. Prochazka, et al. (*J. Am. Ceram. Soc.* 1985, 68(9)479), found that SiC could be sintered to 97% of theoretical density at 2100° C. with the addition of 0.5 wt% B and 1.5 wt% C. In this case, the boron must be well distributed throughout the powder and the carbon must be amorphous. These additives were introduced into the SiC powder by ball milling a mixture of the SiC powder with elemental boron or boron carbide for two hours in hexane. This traditional milling technique provides macroscopic mixing of the sintering aids throughout the bulk powder. Since the boron and carbon are added separately, however, regions that are rich in boron or carbon may be formed.

SUMMARY OF INVENTION

The present invention is directed to boron-substituted polysilazanes in which the boron is bound through boron-carbon bonds to the polysilazane backbone, and compositions which include such boron-substituted polysilazanes. Preferably the polysilazanes comprise at least one member selected from the group consisting of alkenyl groups and alkynyl groups, wherein the alkenyl group is selected from the group consisting of vinyl groups and allyl groups.

Although polysilazanes containing boron have been disclosed, in general these boron-substituted polysilazanes have been prepared by methods which introduce boron-nitrogen or boron-oxygen bonds into the polysilazane. In accordance with the present invention, however, polysilazanes with boron-carbon bonded substituents on the polysilazane backbone are prepared by the hydroboration of alkenyl- or alkynyl-substituted polysilazanes. In the boron-substituted polysilazanes or polymers of the present invention, the sites of alkenyl or alkynyl unsaturation are directly bound to the silicon in the polysilazane. The boron-substituted polysilazanes of the present invention have particular utility as sintering aid-binders for silicon carbide, because of the boron-carbon substituents on the polysilazane backbone.

Thus, the boron-substituted polysilazanes of the present invention, also referred to herein as preceramic polymers, have particular utility as sintering aid precursor binders for silicon carbide wherein good dispersion of sintering aids in the ceramic powder is necessary to produce a uniform ceramic body.

The boron-substituted polysilazane may also serve as a binder for ceramic or metal powders. As used herein, a binder is a substance added to a powder, e.g., ceramic powder or metal powder, to give formed items green strength sufficient for handling in all stages prior to firing.

The compositions which include boron-substituted polysilazanes in accordance with the present invention are also advantageous in that they are capable of being crosslinked, for example, by being subjected to an energy input which is preferably selected from the group consisting of heat, UV irradiation, electron-beam irradiation, and gamma ray irradiation.

In accordance with the present invention, the composition, including boron-substituted polysilazanes, may also include a free-radical generator. Preferred free radical generators are selected from the group consisting of peroxides and azo compounds. The peroxides suitable for this purpose are preferably selected from the group consisting of dicumyl peroxide, t-butyl cumyl peroxide, bis-2,4-dichlorobenzoyl peroxide, t-butyl perbenzoate, t-butyl peracetate, 2,5-di(t-butylperoxy)hexane, and di-t-butylperoxide. The azo compounds suitable for this purpose are preferably selected from the group consisting of 2,2'-azobis(2-methylpropionitrile), 2,2'-azobis(2,4-dimethyl-4-methoxyvaleronitrile) and 2-(t-butylazo)isobutyronitrile.

For purposes of the present invention, the composition may also include a filler, which is preferably selected from the group consisting of SiC, $Si_3N_4$, $SiO_2$, BN, AlN, $Al_2O_3$, TiN, TiC, Si, Ti, Zr, $ZrO_2$, $B_4C$ and $Y_2O_3$, wherein the filler is most preferably selected from the group consisting of $\alpha$-SiC, $\beta$-SiC, and mixtures thereof.

The problems encountered in previous attempts to uniformly disperse sintering aids may be overcome by the present invention using a preceramic polymer binder, i.e., boron-substituted polysilazane, in which the boron is bound through boron-carbon bonds to the polysilazane backbone, that decomposes on pyrolysis to form an amorphous boron-containing char in which the boron is uniformly distributed throughout the char. In accordance with the present invention, the amorphous char contains boron homogeneously distributed on a molecular level. This is particularly effective when the preceramic polymer is a liquid or soluble solid which can uniformly coat the SiC powder in contrast to previous work with sintering aids for SiC in which the boron is added as discrete particulates of B or $B_4C$. Thus, problems previously encountered in dispersing such sintering aids uniformly in ceramic powders are overcome in accordance with the present invention by using preceramic polymer binders which contain precursors for the desired boron-containing amorphous char. Related to this, inasmuch as the polymers of the present invention have a homogeneous distribution of boron and carbon in the polymer and also in the char produced by pyrolysis of the polymer, the char is effective for sintering silicon carbide. This provides a homogeneous distribution of both boron and carbon throughout the molded SiC article. In addition, the excess carbon in the char, as well as the silicon present, further combine to produce SiC and contribute to the overall compositional integrity of the fired ceramic body. The char produced will be amorphous since preceramic polymers generally decompose on pyrolysis to form amorphous chars below 1400° C.; and the amorphous char will contain B, C, Si, and N, and is essentially devoid of boron carbide and elemental boron.

The present invention is also directed to a method for preparing a preceramic polymer containing a boron sintering aid which is chemically bound to the polymer. More specifically, the present invention is directed to a process for preparing a boron-substituted polysilazane which involves preparing a silazane ammonolysis product by reacting ammonia with a halogenated silicon compound selected from the group consisting of $RSiX_3$, $RR'SiX_2$, $RR'R''SiX$, $SiX_4$ and mixtures thereof, wherein X is selected from the group consisting of Cl, Br and I; and R, R' and R'' are the same or different and are selected from the group consisting of H, substituted or unsubstituted 1–6 carbon alkyl groups, aryl groups, 2–6 carbon alkenyl groups, and 2–6 carbon alkynyl groups, and wherein at least one of the halogenated silicon compounds comprises at least one member selected from the group consisting of alkenyl groups and alkynyl groups to prepare a silazane ammonolysis product, and then reacting the silazane ammonolysis product with a borane containing at least one B—H group per molecule under conditions and for a time sufficient to form a boron-substituted polysilazane containing boron-carbon bonds.

Preferably, the halogenated silicon compound is selected from the group consisting of $RSiX_3$ and $RR'SiX_2$.

Most preferably, the halogenated silicon compounds contain alkenyl groups, such as those which are selected from the group consisting of methylvinyldichlorosilane, vinyltrichlorosilane, dimethylvinylchlorosilane, phenylvinyldichlorosilane, allylmethyldichlorosilane, allyltrichlorosilane and 4-but-1-enyldichloromethylsilane.

For purposes of the present invention, the borane is preferably selected from the group consisting of $RR'BH$, $RBH_2$, and $BH_3.L$, in which R and R' may be the same or different and are selected from the group consisting of 1-10 carbon alkyl groups, aryl groups, 2-6 carbon alkenyl groups, and 2-6 carbon alkynyl groups, and L is selected from the group consisting of Lewis base donors. Most preferably the borane is dicyclohexylborane.

In accordance with the present invention, therefore, in order to provide a boron-substituted polysilazane, i.e., as a highly dispersed boron source that can serve as a sintering aid and a binder, an alkenyl- or alkynyl-substituted polysilazane is reacted with a source of boron, i.e., a B—H containing compound. As used herein, polysilazane is meant to include cyclic oligomers and ring-based and linear polymers. Although not wishing to be bound by any particular theory, alkenes and alkynes are believed to react with B—H substituted compounds by addition of the B—H group across the unsaturated hydrocarbon bond; addition reactions of this type are generally known as hydroboration reactions.

Solid, liquid, or fusible polysilazanes are suitable for purposes of the present invention, provided they contain appropriate substituents to undergo hydroboration. In addition, liquid or solid boron-substituted polysilazanes containing appropriate substituents, e.g., vinyl or allyl groups, are capable of being further crosslinked.

In accordance with the present invention, therefore, an alkenyl- or alkynyl-substituted, liquid or solid polysilazane precursor may first be modified by reaction with a B—H containing compound and, optionally, then further crosslinked by supplying an energy input. Crosslinking may be introduced or supplemented by exposure of the boron-substituted, preceramic polymer to ultraviolet light, electron-beam, or gamma ray irradiation. Alternatively, or in addition, boron-substituted polysilazanes containing residual alkenyl or alkynyl groups may be crosslinked by heating with a free radical generator, such as a peroxide.

The boron-substituted preceramic polymers of the present invention may be used as binders in conventional ceramic fabrication processes such as dry pressing, isostatic pressing, slip casting, tape casting, extrusion and injection molding. In addition, they may be used to form coatings, infiltrate preform structures, or as fiber precursors. Each of these uses requires a different amount of polymer. The amount of boron present in the polymer may be tailored so that the overall boron content of the system, i.e., polymer and fillers, is appropriate to the desired application.

The present invention is also directed to an amorphous, boron-containing char which is composed of boron, carbon, silicon, and nitrogen wherein the boron is substantially homogeneously distributed throughout the char and is bonded to the carbon, preferably wherein the char is essentially devoid of elemental boron or boron carbide, and processes for producing the same. In this regard, the amorphous boron-containing char in accordance with the present invention may be produced by subjecting a composition which includes a boron-substituted silicon polymer to pyrolysis wherein the preferred boron-substituted silicon polymer is a boron-substituted polysilazane in which the boron is bound to the polysilazane through boron-carbon bonds.

The present invention is also directed to a method for consolidating silicon carbide with a boron-containing amorphous char by heating a mixture of silicon carbide and a boron-substituted silicon polymer under pyrolysis conditions at a temperature and for a time sufficient to produce a boron-containing amorphous char from the polymer which is essentially devoid of elemental boron and boron carbide, and further heating at a temperature and for a time sufficient to produce a sintered silicon carbide article having a substantially homogeneous distribution of boron throughout the silicon carbide. Preferably, the boron-containing, amorphous char is derived from a boron-substituted polysilazane in which the boron is bound to the polysilazane through boron-carbon bonds, and wherein the silicon carbide is selected from a group consisting of $\alpha$-SiC, $\beta$-SiC, and mixtures thereof. In accordance with this embodiment of the present invention, a sintered silicon carbide article is produced by further heating at a temperature of at least about 1600° C. and most preferably is at least about 1900° C. for a time sufficient to produce a silicon carbide article with a density of greater than about 90% of theoretical density.

DETAILED DESCRIPTION OF INVENTION

In accordance with the present invention, a preceramic polymer, also referred to herein as a polymer precursor containing boron-carbon (B—C) bonds, i.e., a boron-substituted preceramic polymer, is prepared by the hydroboration of alkenyl- or alkynyl-substituted silicon compounds. Although hydroboration reactions are preferred for this purpose, other procedures which incorporate B—C moieties into the preceramic polymer may be used without departing from the spirit and scope of the present invention.

The silicon compounds used to form the boron-substituted preceramic polymers of the present invention are preferably selected from the group consisting of polysilanes, polysilazanes, polycarbosilanes, or any monomeric or oligomeric silicon compound that has appropriate unsaturated substituents for hydroboration and, upon pyrolysis at a temperature of at least 800° C. under an inert atmosphere, e.g., hydrogen, nitrogen, helium, argon, or ammonia-containing atmosphere, forms an amorphous or crystalline ceramic char containing boron, silicon and carbon.

Suitable polysilanes for purposes of the present invention include, but are not limited to: $[(MeSiH)(MeSiCH=CHPh)_m]_n$, and $[(MeSiH)(MeSiCPh=CH_2)_m]_n$, (Du. Z.; Qui, H. J., Poly. Sci.: Part A: Poly. Chem.. 1989, 27, 2861-2869); $[(Me_3Si)(Me_2Si)_x(MeSiCH=CH_2)_y(SiMe_3)]_m$ (Schilling, C.L. Jr., British Poly. J., 1986, 18(6), 355-58); and $[(MeSiH)_x$-

(MeSiCH=CH$_2$)$_y$]$_z$ (Union Carbide vinylpolysilane Y-12044).

Suitable polycarbosilanes for purposes of the present invention include, but are not limited to, [Me$_2$Si—C≡C—]$_n$ [Ph$_2$Si—C≡C]$_n$, [PhMeSi—C≡C]$_n$ and [Me$_2$SiMe$_2$Si—C≡C]$_n$ as disclosed by T.J. Barton et al. in U.S. Pat. No. 4,940,767, the disclosure of which is hereby incorporated in its entirety by reference thereto herein.

Preferably, the boron-substituted preceramic polymer of the present invention is a boron-substituted polysilazane which is produced by a process which involves preparing a silazane ammonolysis product by reacting ammonia with a halogenated silicon compound and then reacting the silazane ammonolysis product with a borane containing at least one B—H group per molecule under conditions and for a time sufficient to form a boron-substituted polysilazane containing boron-carbon bonds.

While polysilanes and polycarbosilanes containing appropriate substituents such as those listed above may be used in this invention, the following discussion and non-limiting examples presented below use hydroborated polysilazanes.

I. Polymer Synthesis

Polysilazane is meant to include cyclic oligomers and ring-based and linear polymers. The first step of the preferred process for preparing the boron-substituted polysilazanes of this invention is an ammonolysis reaction which involves reacting ammonia, or a mixture of ammonia and a substituted or unsubstituted 1-4 carbon alkyl or aryl amine, with a halogenated silicon compound selected from the group consisting of RSiX$_3$, RR'SiX$_2$ and mixtures thereof, including mixtures where more than one compound having the formula RSiX$_3$ or RR'SiX$_2$ is used. Optionally, RR'R"SiX, SiX$_4$ or mixtures thereof can also be present in the reaction mixture. X can be Cl, Br or I. Cl is preferred. R, R', R" can be the same or different and are selected from the group consisting of H, substituted or unsubstituted 1-6 carbon alkyl, aryl, 2-6 carbon alkenyl and 2-6 carbon alkynyl groups. For purposes of the present invention, standard ammonolysis procedures, such as those described in U.S. Pat. No. 4,929,704, the disclosure of which is hereby incorporated in its entirety by reference thereto herein, may be used.

The ammonolysis reaction mixture must contain at least one halogenated silicon compound having an alkenyl or alkynyl group. Examples of halogenated silicon compounds suitable for use in the process of this invention include, but are not limited to, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyldibromosilane, trimethylchlorosilane, dimethylchlorosilane, dimethylvinylchlorosilane, phenylvinyldichlorosilane, allylmethyldichlorosilane, allyltrichlorosilane, 4-but-1-enyldichloromethylsilane and trimethylbromosilane. Preferred alkenyl chlorosilanes for use in the present invention are methylvinyldichlorosilane, vinyltrichlorosilane, dimethylvinylchlorosilane, phenylvinyldichlorosilane, allylmethyldichlorosilane, allyltrichlorosilane, and 4-but-1-enyldichloromethylsilane.

The ammonolysis product, when ammonia alone is reacted with the halogenated silicon compound, is predominantly a mixture of cyclic compounds of varying ring size, but can possibly contain small amounts, usually less than 1%, of linear species. When a mixture of ammonia and an alkyl or aryl amine is used, the ammonolysis product contains more linear than cyclic species.

The resultant alkenyl- or alkynyl-substituted polysilazane is then reacted with a borane containing at least one B—H bond per molecule. The amount of boron present in the boron-substituted preceramic polymers of this invention is readily tailorable.

Any borane containing at least one B—H bond/molecule may be used. Boranes suitable for use in this invention may be selected from the group consisting of RR'BH, RBH$_2$, and BH$_3$.L in which R and R' are the same or different and are selected from the group consisting of 1-10 carbon alkyl groups, aryl groups, 2-6 carbon alkenyl groups, and 2-6 carbon alkynyl groups and L is selected from the group consisting of Lewis base donors. Typical Lewis bases include, but are not limited to, pyridine, ammonia, t-butylamine, dimethylamine, methyl sulfide, trimethylamine, and the like. Thus, suitable boranes include, but are not limited to decaborane, pentaborane, diborane, borane-ammonia complex, borane-tert-butylamine complex, borane-N,N-diethylaniline complex, borane-N,N-diisopropylethylamine complex, borane-dimethylamine complex, 4-(borane-dimethylamino)pyridine complex, borane-4-ethylmorpholine complex, borane-2,6-lutidine complex, borane-4-methyl-morpholine complex, borane-methyl sulfide complex, borane-morpholine complex, borane-1,4-oxathiane complex, borane-4-phenylmorpholine complex, borane-piperazine complex, borane-piperidine complex, borane-poly(2-vinylpyridine) complex, borane-pyridine complex, borane-trimethylamine complex, borane-triphenylphosphine complex, 9-borabicyclo[3.3.1]nonane, dicyclohexylborane, bis-3-methyl-2-butylborane, sym-bis(2,4,4-trimethyl-3-pentyl) diborane, sym-tetrakis-(trans-2-methylcyclohexyl)-diborane and sym-tetraisopinocampheyldiborane. The most preferred borane is dicyclohexylborane.

The hydroboration reaction, which is the preferred means for incorporating B—C moieties into the preceramic polymer, may be carried out over a wide range of temperatures, e.g., from about −78° C. to about 200° C. depending upon the specific organosilicon compound and borane chosen. The preferred reaction temperature range is from about −78° C. to about 30° C. The reaction may be conducted with or without a solvent, although it is preferably conducted with a solvent. Solvents such as tetrahydrofuran, toluene, diethyl ether, dichloromethane and the like may be used provided the B-H containing compound is compatible with the solvent. Typical reaction conditions and examples of hydroboration reactions are well known, for example, as disclosed by Brown, H.C. "Hydroboration"; W.A. Benjamin, Inc.: New York, 1962, and Brown, H.C., Curr. Trends Oro. Synth. Proc. Int. Conf. 4th 1982, 247–68.

The polymers produced in accordance with the present invention have the boron directly bound through boron-carbon bonds to the polysilazane backbone because the boron is added via a hydroboration reaction. This produces a homogeneous distribution of boron throughout the polysilazane. Preferably, alkenyl- or alkynyl-substituted polysilazanes are reacted with boranes via hydroboration to give boron-carbon bonded substituents on the backbone of the polysilazane.

The boron-substituted polymers useful as sintering aid precursors prepared in accordance with the present invention may be in the liquid, solid, or fusible state. For fusible precursors, i.e., liquids, and soluble and/or meltable solids, which contain residual alkenyl or alkynyl substituents, further crosslinking may be introduced into the material by a thermosetting process in which the sintering aid precursor is heated in the presence of a free radical generator. An effective quantity of a free radical generator means a quantity sufficient to crosslink the boron-substituted polysilazane. The concentration of the free radical generator is generally from about 0.01 to 5.0 wt.% based on the weight of the polysilazane. The thermosetting reaction is conducted at a temperature at which a significant fraction of the free radical generator has decomposed to form radical species. This temperature will depend upon the particular free radical generator chosen and may be readily determined by one skilled in the art. For example, when 0.5 wt% of the free radical generator dicumyl peroxide is used, the thermosetting reaction takes place readily at about 130° C. Higher or lower thermosetting temperatures may be needed depending upon the free radical generator chosen.

For purposes of the present invention, free radical generators include, but are not limited to, peroxides and azo compounds. Peroxides which are suitable for purposes of the present invention include dicumyl peroxide, t-butyl cumyl peroxide, bis-2,4-dichlorobenzoyl peroxide, t-butyl perbenzoate, t-butyl peracetate, 2,5-di(t-butylperoxy)hexane, and di-t-butyl peroxide. Azo compounds which are suitable for purposes of the present invention include 2,2'-azobis(2-methylpropionitrile), 2,2'-azobis(2,4-dimethyl-4-methoxyvaleronitrile), and 2-(t-butylazo)isobutyronitrile. The boron-substituted sintering aid precursors may also be cured by exposure to UV light or electron beam irradiation.

The cured or uncured boron-substituted polysilazane preceramic polymers of the present invention can be pyrolyzed at a temperature of at least 800° C. under an inert atmosphere, e.g., hydrogen, nitrogen, helium, argon, or ammonia-containing atmosphere, to yield a silicon carbide-containing ceramic material.

The boron-substituted polysilazanes of the present invention can additionally contain fillers. Suitable fillers include, for example, SiC, $Si_3N_4$, $SiO_2$, BN, AlN, $Al_2O_3$, TiN, TiC, Si, Ti, Zr, ZrC, $ZrO_2$, $B_4C$ and $Y_2O_3$ which may be in the form of powders, whiskers or platelets.

The cured or uncured boron-substituted preceramic polymers of the present invention may be used in the preparation of ceramic fibers and foams, in the infiltration of a preform structure and subsequent pyrolysis to a ceramic composite, in the production of oxidation resistant coatings, as a thin film, as an adhesive or sealant, as a binder for ceramic or metal powders, and in injection molding.

In accordance with the present invention, an amorphous boron-containing char may be produced by subjecting a composition which includes a boron-substituted silicon polymer to pyrolysis so as to result in an amorphous, boron-containing char which includes boron, carbon, silicon and nitrogen wherein the boron is substantially homogeneously distributed throughout the char and is bonded to the carbon, i.e., the boron is bound to the polysilazane through boron-carbon bonds.

II. Polymer Application as a Sintering Aid for Silicon Carbide

A specific application for which the polymers of the present invention are particularly suited is the sintering and subsequent densification of silicon carbide. Three routes to a SiC-containing ceramic are possible: i) pyrolysis of the unfilled polymer; ii) pyrolysis of the polymer with fillers other than SiC; and iii) in the preferred embodiment, pyrolysis of the polymer in which the filler is substantially SiC.

The unfilled polymers of this invention, under the appropriate pyrolysis conditions, may be converted to monolithic sintered silicon carbide articles provided they contain an amount of boron sufficient to promote sintering of the SiC formed in the pyrolysis of the polymer. From about 0.1–20 wt% boron in the preceramic polymer is preferred, with 0.2–2.0 wt% boron being more preferred, and 0.3–1.0 wt% being most preferred.

The boron-substituted, preceramic polymers of the present invention may further contain ceramic or metal fillers other than SiC including, e.g., Si, $Si_3N_4$, $SiO_2$, AlN, $Al_2O_3$, TiN, TiC, Ti, Zr, Hf, $ZrO_2$, $Y_2O_3$, and ZrC in the form of powders, whiskers, or platelets. When such fillers are used, they may be present in an amount such that after sintering no more than about 50 wt% of the total sintered article comprises the filler.

In a preferred embodiment of this invention, SiC is used as a filler in the boron-substituted preceramic polymers of the present invention, and may be present in an amount of from about 10 wt%–98 wt% of the total precursor/SiC mixture. α-SiC, β-SiC, and mixtures thereof may be used. Additionally, mixtures of the boron-substituted preceramic polymer with SiC and other ceramic or metal fillers may be used. When present, the SiC and other ceramic or metal fillers must provide enough SiC so that the sintered article contains at least about 50 wt% SiC.

In accordance with the present invention, silicon carbide may be consolidated with a boron-containing amorphous char by a process which involves heating a mixture of silicon carbide and a boron-substituted silicon polymer under pyrolysis conditions at a temperature and for a time sufficient to produce a sintered silicon carbide article having a substantially homogeneous distribution of boron throughout the silicon carbide. Preferably, the boron-substituted silicon polymer is a boron-substituted polysilazane in which the boron is bound to the polysilazane through boron-carbon bonds. The silicon carbide is preferably selected from the group consisting of α-SiC, β-SiC and mixtures thereof. The temperatures suitable for this purpose are at least about 1600° C., and most preferably at least about 1900° C. and the heating is continued for a time sufficient to produce a silicon carbide article with a density which is preferably greater than about 90% of theoretical density.

By using the boron-substituted polysilazanes of this invention as SiC powder binders, silicon carbide thus may be sintered on a local scale (100 μm) at a temperature of at least about 1600° C., and densified at a temperature of at least about 1900° C., and most preferably above about 2100° C.

As used herein, sintering means the process in which two adjacent ceramic grains become physically connected. There have been many mechanisms postulated for this, not all of which result in densification. All sintering mechanisms rely upon movement of matter in order to connect adjacent grains. Densification means the increase of matter in a specific volume, or a decrease of the void space. Although often used synonymously, the terms sinter and densify, as found in this specification, have specific, and different, meanings.

III. Formation of Shaped Ceramic Articles

Mixtures of SiC powder and/or additional fillers with the boron-substituted polysilazanes of this invention may be prepared using standard ceramic mixing equipment which includes, but is not limited to, a ball mill, a double planetary mixer, a three roll mill, a sigma blade mixer, a ribbon blender, an extruder and other methods known to those skilled in the art.

Mixtures of the boron-substituted polysilazane binder and fillers may be molded by processes including, but not limited to, dry pressing, tape casting, isostatic pressing, extrusion and injection molding. Because each of these molding operations requires a different amount of boron-substituted polymer, the amount of boron present in the polymer may be tailored so that the overall boron content of the system, i.e., the preceramic polymer binder, SiC powder and other fillers, is appropriate to sinter the silicon carbide.

For example, injection molding requires about 15 wt%–50 wt% polymer, while extrusion uses about 30 wt%–60 wt% polymer. If the total system boron content for sintering each molding mixture, i.e., polymer, SiC, and/or additional fillers, was set at 0.5 wt%, for example, the polymer used in injection molding would require a higher boron substitution content than that used for extrusion since less polymer is used in the injection molding process. Thus, a 0.5 wt% boron level in an injection molding mix containing 30 wt% preceramic polymer, which provides a 50 wt% char at 1400° C., would require a boron level of about 1.4 wt% in the boron-substituted polysilazane. Likewise, a 0.5 wt% boron level in an extrusion mix containing 50 wt% preceramic polymer, which provides a 50 wt% char at 1400° C., would require a boron level of about 0.7 wt% in the boron-substituted polysilazane.

Pyrolysis of the mixture must be conducted in a non-reactive atmosphere, such as nitrogen, argon, helium, hydrogen and the like. The pyrolysis at temperatures lower than 1400° C. produces an amorphous boron-containing char from the boron-substituted preceramic polymer. The char further contains carbon, silicon and nitrogen. The boron is homogeneously distributed throughout this char and is intimately bonded. The boron is not present as either elemental boron or boron carbide. Further heating, to temperatures of at least about 1800° C., will crystallize the char. While not wishing to be bound by any particular theory, it is believed that sintering occurs during crystallization of the preceramic polymer because atomic mobilities are maximized. Since the temperature at which a specific sintering aid precursor binder will crystallize during pyrolysis varies, the temperature required to sinter each SiC/binder mixture will vary. Additional heating at temperatures greater than the crystallization temperature i.e., to temperatures of at least about 1900° C., may be required to fully densify the molded article. As used herein, "fully densify" means to attain a density that is about 90% or greater of the theoretical density of single crystal silicon carbide.

EXAMPLES 1-3

The following discussion and non-limiting examples are given to further explain and illustrate the present invention, as described above, and should not be construed to limit the present invention to the specific limitations described.

The hydroboration of vinylsilanes, in general, involves the addition of a B—H bond to a vinyl-substituted silane which, when conducted at 0° C., produces α- and β-addition products in high yields. For example, the reaction of vinyltrimethylsilane with an excess of borane-tetrahydrofuran complex gives the two addition products in quantitative yield as shown by Equation (1):

$$Me_3SiCH=CH_2 + xs\ BH_3.THF \rightarrow Me_3SiCH(BH_2) \quad (1)$$

40%, β-addition 60%, α-addition

A variety of boron-substituted polysilazan were prepared by reacting a vinyl-substituted polysilazane with varying levels of dicyclohexylborane. The reaction chemistry for preparing, as examples of the present invention, each precursor is shown in Schemes 1-3 below. Polymers I, II and III each contain different addition levels of boron.

EXAMPLE 1

Scheme 1 shows the reaction of a vinyl-substituted polysilazane with 8 mol% dicyclohexylborane. The liquid poly(methylvinyl)silazane was prepared by the ammonolysis of a mixture of methyldichlorosilane and methylvinyldichlorosilane (4:1 mole ratio). This precursor was then reacted with dicyclohexylborane [(cy)$_2$BH] generated by the reaction of two equivalents of cyclohexene with one equivalent of BH$_3$.THF adduct. The reaction sequence is shown in Scheme 1.

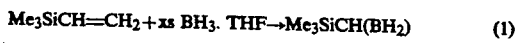

Scheme 1

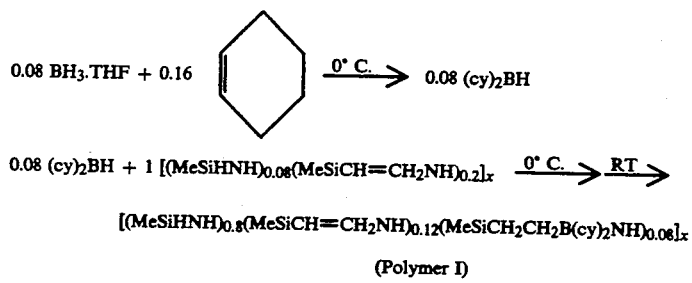

$0.08\ BH_3.THF + 0.16\ \bigcirc \xrightarrow{0°\ C.} 0.08\ (cy)_2BH$ $0.08\ (cy)_2BH + 1\ [(MeSiHNH)_{0.08}(MeSiCH=CH_2NH)_{0.2}]_x \xrightarrow{0°\ C.} \xrightarrow{RT}$ $[(MeSiHNH)_{0.8}(MeSiCH=CH_2NH)_{0.12}(MeSiCH_2CH_2B(cy)_2NH)_{0.08}]_x$ (Polymer I)

The product of hydroboration, designated Polymer I, contains 8 mol% boron. The formula representing Polymer I is written, for convenience only, as if the hydroboration occurred by β-addition; α-addition products may also be present. Because Polymer I contains residual vinyl substituents, it may be thermoset by heating with a free radical generator, e.g. dicumyl peroxide, to about 150° C.

EXAMPLE 2

The methodology used to prepare this boron-substituted polysilazane may be extended to many other preceramic polymer systems. Scheme 2 shows the hydroboration of an oligomeric methylvinylsilazane, (MeSiCH=CH$_2$NH)$_x$, to give Polymer II which contains 33 mol% boron.

Scheme 2

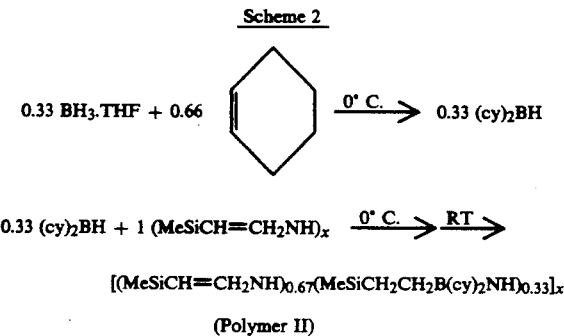

0.33 BH$_3$.THF + 0.66 [benzene] $\xrightarrow{0° C.}$ 0.33 (cy)$_2$BH 0.33 (cy)$_2$BH + 1 (MeSiCH=CH$_2$NH)$_x$ $\xrightarrow{0° C.} \xrightarrow{RT}$

[(MeSiCH=CH$_2$NH)$_{0.67}$(MeSiCH$_2$CH$_2$B(cy)$_2$NH)$_{0.33}$]$_x$ (Polymer II)

Likewise, Polymer III was generated by the hydroboration of the polysilazane [MeSiHNH)$_{0.8}$(MeSiCH=CH$_2$NH)$_{0.2}$]$_x$ to give a polymer with 19 mol% boron. The reaction scheme is shown below.

Scheme 3

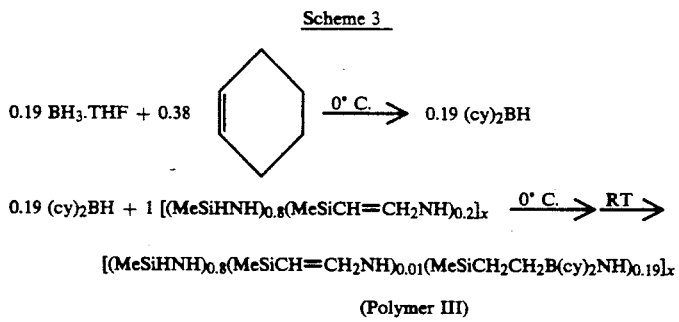

0.19 BH$_3$.THF + 0.38 [benzene] $\xrightarrow{0° C.}$ 0.19 (cy)$_2$BH 0.19 (cy)$_2$BH + 1 [(MeSiHNH)$_{0.8}$(MeSiCH=CH$_2$NH)$_{0.2}$]$_x$ $\xrightarrow{0° C.} \xrightarrow{RT}$

[(MeSiHNH)$_{0.8}$(MeSiCH=CH$_2$NH)$_{0.01}$(MeSiCH$_2$CH$_2$B(cy)$_2$NH)$_{0.19}$]$_x$ (Polymer III)

EXAMPLES 4–15

The utility of the boron-substituted polymers of this invention is illustrated by the following Examples which are presented by way of non-limiting examples to further illustrate the present invention.

All reactions were conducted under nitrogen using standard inert atmosphere techniques. Solvents were dried with 4A and 13X Linde molecular sieves and sparged with dry nitrogen before use. Cyclohexene and 1.0 M borane-THF adduct were obtained from Aldrich and used as received. Dicumyl peroxide was obtained from the Hercules Gibbstown plant and used as received. Fine-grained Starck A-10 and B-10 silicon carbide powders were used in the sintering and densification studies.

For Examples 5 and 7, samples were pyrolyzed in an Astro Model 1000 furnace under an Ar atmosphere with a 10° C./min ramp and a maximum temperature of 1600° C. A one-hour hold at the maximum temperature was used. For Examples 9, 12, and 13, samples were hot-pressed at 4000 psi in a 2" graphite die. The hot press used was a Thermal Technology Inc. Model HP 50-HTG-7010 with a graphite hot zone. The pressing schedule was 10° C./min to 2100° C. with a 2 hour hold at a maximum temperature. Ceramic samples were characterized by X-ray powder diffraction and scanning electron microscopy (SEM). Densities were determined by geometrical measurement and calculation.

EXAMPLE 4:

Preparation of Boron-substituted Polysilzane with 8 mol% Boron: Polymer I

A 100 ml, three-necked, round-bottomed flask was sparged with nitrogen and equipped with a 25 ml dropping funnel, a thermometer, a stir bar and a septum. The flask was charged with 13.0 ml (13.0 mmol) BH$_3$.THF adduct and cooled to 0° C. in an ice bath. The dropping funnel was charged with 2.64 ml (26.0 mmol) cyclohexene and 10 ml tetrahydrofuran (THF). The cyclohexene/THF mixture was added dropwise over 35 min. A white solid (dicyclohexylborane) formed. The reaction mixture was stirred for one hour at 0° C. The dropping funnel was then charged with 10.0g (155.4 mmol) poly(methylvinyl)silazane, [(MeSiHNH)$_{0.8}$(MeSiViNH)$_{0.2}$]$_x$, and 10 ml THF and added to the reaction mixture over fifteen minutes. After the polysilazane addition was complete, the reaction mixture was stirred for 45 min at 0° C. and then warmed to room temperature. The white solid disappeared and a clear solution was formed. The THF was removed in vacuo to give an opaque liquid with a viscosity of 402 centipoise (cps). The boron-substituted polysilazane, Polymer I, contained about 1.1 wt% boron bound to the polymer backbone. TGA analysis (10° C./min,25–950° C.): 47.3 wt%.

Dicumyl Peroxide Cure of Polymer I

A one ounce jar was equipped with a stir bar and a septum, charged with 0.1 g dicumyl peroxide and sparged with nitrogen. Polymer I (5 g) was added by syringe. The jar, with a nitrogen inlet in the septum, was placed in a heated oil bath. At about 150° C., the liquid cured (thermoset) and a solid formed. TGA analysis (10° C./min,25–950° C.): 63.2 wt%.

For the hydroborated poly(methylvinyl)silazane described in Example 4, sintering was demonstrated on a local scale at 1600° C., a temperature at which the boron-substituted preceramic polymer is partially crystallized. Complete densification of a SiC article containing the boron-substituted/substituted preceramic polymer binder was effected by hot pressing at 2100° C.

EXAMPLE 5

Sintering of α-Sic with Boron-Substituted Polysilazane (Polymer I)

Under nitrogen, seventy percent by weight of Starck A-10 α-SiC powder was mixed into Polymer I containing 0.5 wt% dicumyl peroxide. The mixture was cured by heating at 150° C. under nitrogen. The cured piece was fired in a carbon crucible under an argon atmosphere at a ramp rate of 10° C./min to 1600° C. The furnace temperature was maintained at 1600° C. for one hour after which the power was turned off and the sample allowed to cool in the furnace. Examination of a fractured surface via SEM shows that the material had sintered. The fracture proceeded through the individual grains and the grains were approximately 3–5 $\mu$m in diameter.

EXAMPLE 6:

Comparison of Ceramic Prepared in Example 5 with Commercial Sintered SIC

For comparative purposes, a monolithic sample of a commercial alpha silicon carbide ceramic was obtained from Hexoloy SA, Carborundum. The Hexoloy SA sample of alpha silicon carbide ceramic is an alpha silicon carbide which is reportedly pressureless sintered at about 2100° C. An SEM micrograph of a fracture surface shows some porosity. There is a strong similarity, however, of this micrograph to that of the pyrolyzed SiC-filled, boron-substituted polysilazane of Example 5. An equivalent microstructure has thus been achieved at a firing temperature 500° C. lower by using a boron-substituted polysilazane binder.

EXAMPLE 7:

Pyrolysis of $\alpha$-SIC with Polysilazane (No Boron Modification) Control Example Seventy by weight of Starck A-10 $\alpha$-SIC powder was mixed into poly(methylvinyl)silazane containing 0.5 wt% dicumyl peroxide. The mixture was cured by heating under nitrogen at 150° C. The cured piece was fired in a carbon crucible under an argon atmosphere at a ramp rate of 10° C./min to 1600° C. The furnace temperature was maintained at 1600° C. for one hour after which the power was turned off and the sample allowed to cool in the furnace. Examination of a fractured surface via a scanning electron microscope (SEM) shows that while there is some interconnectivity between the individual grains, the majority of the material is composed of loose particles. The fracture proceeded entirely between grains and the micrograph of the surface shows no apparent fracture patterns.

EXAMPLE 8

In Situ Preparation of Boron-Substituted Methylvinylsilazane with 33 Mol% Boron: Polymer II A 250 ml, three-necked, round-bottomed flask was sparged with nitrogen and equipped with a 50 ml dropping funnel, a thermometer, a stir bar, and a septum. The flask was charged with 46.25 ml (46.25 mmol) BH$_3$.THF adduct and cooled to 0° C. in an ice bath. The dropping funnel was then charged with 9.37 ml (92.5 mmol) cyclohexene and 36 ml tetrahydrofuran (THF). The cyclohexene/THF mixture was added dropwise over 45 min. A white solid (dicyclohexylborane) formed. The reaction mixture was stirred for one hour at 0° C. The dropping funnel was then charged with 11.76 g (138 mmol) methylvinylsilazane, (MeSiViNH)$_x$ and 36 ml THF and added to the reaction mixture over thirty minutes. After the polysilazane addition was complete, the reaction mixture was stirred for 45 minutes at 0° C. and then warmed to room temperature. The white solid had disappeared and a clear solution was formed. The boron-substituted polysilazane, Polymer II, contained about 2.5 wt% boron bound to the polymer backbone. This solution was used in the following example.

EXAMPLE 9:

Densification of $\alpha$-SiC With Boron-Substituted Methylvinylsilazane (Polymer II)

The THF solution of the hydroborated polysilazane (Polymer II) in Example 8 was cannulated into a sparged, 250 ml, one-necked flask containing 80.0 g Starck A-10 $\alpha$-SiC powder. The mixture was stirred and the THF was removed in vacuo to give a powder containing 80 wt% SiC and 20 wt% hydroborated polysilazane ($\approx$0.5 g B content). The mixture was hot-pressed under the following conditions: argon atmosphere, 10° C./min ramp from 25° C. to 2100° C. After reaching 2100° C., the sample was maintained at this temperature for 2 hours and then cooled to room temperature. Examination of a fractured surface via SEM shows that the material had sintered and densified. Fully connected grains were present. The fracture was smooth and no grain boundary phase was observed. The hot-pressed piece had a density of 3.01 g/cc. The X-ray diffraction pattern showed only $\alpha$-SiC.

EXAMPLE 10:

Pyrolysis of $\alpha$-SiC with Methylvinylsilazane (No Boron Modification) Control Example A 500 ml, one-necked, round-bottomed flask was equipped with a stir bar and charged with 80.0 g of Starck A-10 $\alpha$-SiC. The flask was topped with a septum and then charged with 20.0 g of methylvinylsilazane, (MeSiViNH)" and 300 ml of hexane by syringe. The mixture was stirred as the hexane was removed in vacuo to give a dry powder. This mixture was hot-pressed under the following conditions: argon atmosphere, 10° C./min ramp from 25° C. to 2100° C. After reaching 2100° C., the sample was maintained at this temperature for 2 hours and then cooled to room temperature. The hot-pressed sample had a density of only 2.0 g/cc. By SEM, the piece had semi-connected grains with many pores.

EXAMPLE 11:

In Situ Preparation of Boron-Substituted Polysilazane with 19 Mol% Boron: Polymer III A 250 ml, three-necked round-bottom flask was sparged with nitrogen and equipped with a 50 ml dropping funnel, a thermometer, a stir bar, and a septum. The flask was charged with 38.38 ml (38.38 mmol) BH$_3$.THF adduct and cooled to 0° C. in an ice bath. The dropping funnel was charged with 7.78 ml (76.7 mmol) cyclohexene and 36 ml tetrahydrofuran (THF). The cyclohexene/THF mixture was added dropwise over 45 min. A white solid (dicyclohexylborane) formed. The reaction mixture was stirred for one hour at 0° C. The dropping funnel was then charged with 13.0 g (202.0 mmol) poly(methylvinyl)silazane, [MeSiHNH)$_{0.8}$ (MeSiViNH)$_{0.2}$]$_x$ and 36 ml THF and added to the reaction mixture over 30 min. After the polysilazane addition was complete, the reaction mixture was stirred for 30 min at 0° C. and then warmed to room temperature. The white solid disappeared and a clear solution was formed. The boron-substituted polysilazane, Polymer III, contained about 2.1 wt% boron bound to the polymer backbone. This solution was used in the following example.

EXAMPLE 12:

Densification of α-SiC with Boron-Substituted Polysilazane (Polymer III)

The THF solution of the hydroborated polysilazane (Polymer III) in Example 11 was cannulated into a sparged, 500 ml, one-necked flask containing 79.8 g Starck A-10 α-SiC powder. The mixture was stirred and the THF was removed in vacuo to give a powder containing 80 wt% SiC and 20 wt% hydroborated polysilazane ($\approx 0.42$ g B content). The mixture was hot-pressed under the following conditions: argon atmosphere, 10° C./min ramp from 25° C. to 2100° C. After reaching 2100° C., the sample was maintained at this temperature for 2 hours and then cooled to room temperature. Examination of a fractured surface via SEM shows that the material had sintered and densified. Fully connected grains were present. The fracture was smooth and no grain boundary phase was observed. The hot-pressed piece had a density of 3.0 g/cc. The X-ray diffraction pattern showed only α-SiC.

EXAMPLE 13

Densification of β-SiC with Boron-Substituted Polysilazane (Polymer III)

The hydroborated polysilazane Polymer III solution in THF was prepared as described in Example 11. This solution was cannulated into a sparged, 500 ml, one-necked flask containing 79.8 g Starck B-10 β-SiC powder. The mixture was stirred and the THF was removed in vacuo to give a powder containing 80 wt% SiC and 20 wt% hydroborated polysilazane ($\approx 0.42$ g B content). The mixture was hot-pressed under the following conditions: argon atmosphere, 10° C./min ramp from 25° C. to 2100° C. After reaching 2100° C., the sample was maintained at this temperature for 2 hours and then cooled to room temperature. Examination of a fractured surface via SEM shows that the material had sintered and densified. Fully connected grains were present. The fracture was smooth and no grain boundary was observed. The hot-pressed piece had a density of 3.1 g/cc. The X-ray diffraction pattern showed only α-SiC.

EXAMPLE 14:

Ultraviolet Light Crosslinking Cure of Boron-Substituted Polysilazane (Polymer I)

In a dry box, a sample ($\approx 0.5$ ml) of the liquid boron-substituted polysilazane Polymer I was placed in a small quartz Erlenmeyer flask and closed with a septum. The septum was covered with foil and the flask was exposed to a broad band mercury light at a distance of about six inches. The sample temperature did not rise above 30° C. After exposure for 97 ¾ h, a solid, cured material was produced.

EXAMPLE 15:

Pyrolysis of Boron-Substituted Polysilazane (Polymer II) in Argon

A sample of boron-substituted polysilazane, i.e., Polymer II, which had a TGA yield of 24.4 wt%, was prepared and in a dry box transferred to a 2 oz. jar and mixed with 0.5 wt% dicumyl peroxide. The jar was topped with a septum and removed from the dry box. The jar was placed in a preheated 160° C. oil bath with a nitrogen inlet in the septum. After several hours the mixture cured to a rubbery solid. This solid had a TGA yield of 49.2 wt%. After cooling to room temperature, the jar was taken into the dry box and the sample divided into three parts. Each portion of the cured Polymer II was subjected to pyrolysis at 10° C./min under Ar to 1400° C., 1600° C. and 1800° C. After a two hour hold at each maximum temperature, the black samples were cooled to room temperature and X-ray diffraction analysis was conducted. After heating to 1400° C., the sample was substantially amorphous, although broad peaks in the correct region for β-SiC and small peaks for α-SiC were observed. These peaks became sharper and more distinct in the X-ray pattern for the sample pyrolyzed at 1600° C., although some amorphous material was still present. The X-ray sample pyrolyzed to 1800° C. showed intense, sharp peaks for crystalline β-SiC and small peaks for α-SiC.

Although the invention has been described with reference to particular means, materials and embodiments, from the foregoing, one skilled in the art can easily ascertain the essential characteristics of the present invention; and various changes and modifications may be made to various usages and conditions without departing from the spirit and scope of the invention as described in the claims that follow.

What is claimed is:

1. A composition comprising a boron-substituted polysilazane wherein the boron is derived from a borone and is bound to the polysilazane through boron-carbon bonds.

2. The composition of claim 1, wherein said polysilazane contains at least one member selected from the group consisting of alkenyl groups and alkynyl groups.

3. The composition of claim 2, wherein said alkenyl groups are selected from the group consisting of vinyl groups and allyl groups.

4. The composition of claim 2, further comprising a free radical generator.

5. The composition of claim 4, wherein said free radical generator is selected from the group consisting of peroxides and azo compounds.

6. The composition of claim 5, wherein said peroxide is selected from the group consisting of dicumyl peroxide, t-butyl cumyl peroxide, bis-2,4-dichlorobenzoyl peroxide, t-butyl perbenzoate, t-butyl peracetate, 2,5-di(t-butylperoxy)hexane, and di-t-butylperoxide.

7. The composition of claim 5, wherein said azo compound is selected from the group consisting of 2,2'-azobis(2,4-dimethyl-4-methoxyvaleronitrile), 2,2'-azobis(2-methyl proprionitrile), and 2-(t-butylazo)isobutyronitrile.

8. The composition of claim 1, further comprising a filler.

9. The composition of claim 8, wherein said filler is selected from the group consisting of SiC, $Si_3N_4$, $SiO_2$, BN, AlN, $Al_2O_3$, TiN, TiC, ZrC, Si, Ti, Zr, $ZrO_2$, $B_4C$ and $Y_2O_3$.

10. The composition of claim 9, wherein said filler is selected from the group consisting of α-SiC, β-SiC, and mixtures of α-SiC and β-SiC.

11. A process for preparing a boron-substituted polysilazane, said process comprising:
(a) preparing a silazane ammonolysis product by reacting ammonia with a halogenated silicon compound selected from the group consisting of $RSiX_3$, $RR'SiX_2$, $RR'R''SiX$, $SiX_4$ and mixtures thereof, wherein X i selected from the group consisting of Cl, Br and I; and R, R' and R" are the same or different and are selected from the group consisting of H, substituted or unsubstituted 1-6 carbon alkyl groups, aryl groups, 2-6 carbon alkenyl groups and 2-6 carbon alkynyl groups, and wherein at least one of the halogenated silicon compounds comprises at least one member selected from the group consisting of alkenyl groups and alkynyl groups; and (b) reacting said silazane ammonolysis product with a borane containing at least one B—H group per molecule under conditions and for a time sufficient to form a boron-substituted polysilazane wherein the boron is derived from the borane and is bound to the polysilazane through boron-carbon bonds.

12. The process for preparing a boron-substituted polysilazane of claim 11, wherein said halogenated silicon compound is a member selected from the group consisting of $RSiX_3$, and $RR'SiX_2$.

13. The process for preparing a boron-substituted polysilazane of claim 11, wherein said halogenated silicon compounds containing alkenyl groups are selected from the group consisting of methylvinyldichlorosilane, vinyltrichlorosilane, dimethylvinylchlorosilane, phenylvinyldichlorosilane, allylmethyldichlorosilane, allyltrichlorosilane and 4-but-1-enyldichloromethylsilane.

14. The process for preparing a boron-substituted polysilazane of claim 11, wherein said borane is selected from the group consisting of RR'BH, $RBH_2$, and $BH_3.L$, in which R and R' are the same or different and are selected from the group consisting of 1-10 carbon alkyl groups, aryl groups, 2-6 carbon alkenyl groups, and 2-6 carbon alkynyl groups, and L is selected from the group consisting of Lewis base donors.

15. The process for preparing a boron-substituted polysilazane of claim 14, wherein said borane is dicyclohexylborane.

16. The product produced by the process of claim 11.

17. A process for preparing a crosslinked polymer from a boron-substituted polysilazane, said process comprising:
subjecting a composition comprising the boron-substituted polysilazane of claim 1 comprising a member selected from the group consisting of alkenyl groups and aklynyl groups, and a free radical generator to an energy input for a time sufficient to produce a crosslinked boron-substituted polysilazane.

18. The process for preparing a crosslinked polymer of claim 17, wherein said energy input is a treatment selected from the group consisting of heat, UV irradiation, electron beam irradiation, and gamma ray irradiation.

19. A crosslinked product produced by the process of claim 17.

20. An amorphous boron-containing char consisting essentially of boron, carbon, silicon, and nitrogen wherein said boron is substantially homogeneously distributed throughout said char.

21. The amorphous boron-containing char of claim 20, which is essentially devoid of elemental boron and boron carbide.

22. A process of producing an amorphous, boron-containing char, said process comprising:
subjecting a composition comprising a boron-containing silicon, polymer to pyrolysis.

23. The process of claim 22, wherein said boron-containing silicon polymer is a boron-substituted polysilazane wherein the boron is derived from a borane and is bound to the polysilazane through boron-carbon bonds.

24. The product produced by the process of claim 22.

25. A ceramic fabrication process comprising:
subjecting a boron-substituted polysilazane, wherein the boron is derived from a borane and is bound to the polysilazane through boron-carbon bonds, to pyrolysis conditions at a temperature and for a time sufficient to produce a ceramic article.

26. The ceramic fabrication process of claim 25, further comprising combining said boron-substituted polysilazane with a filler prior to subjecting said boron-substituted polysilazane to pyrolysis conditions.

27. The product produced by the process of claim 25.

28. The product produced by the process of claim 26.

29. A method for consolidating silicon carbide with a boron-containing amorphous char, said method comprising:
a) heating a mixture comprising silicon carbide and a boron-substituted silicon polymer under pyrolysis conditions and for a time sufficient to produce an amorphous, boron-containing char which is essentially devoid of elemental boron and boron carbide; and
b) further heating said mixture at a temperature for a time sufficient to produce a sintered, silicon carbide article having a substantially homogeneous distribution of boron throughout said silicon carbide article.

30. The method of claim 29, wherein said boron-substituted silicon polymer is a boron-substituted polysilazane wherein the boron is derived from a borane and is bound to the polysilazane through boron-carbon bonds.

31. The method of claim 29, wherein said silicon carbide is selected from the group consisting of $\alpha$-SiC, $\beta$-SiC and mixtures thereof.

32. The method of claim 29, wherein said temperature is at least about 1600° C.

33. The method of claim 29, wherein said temperature is at least about 1900° C. and said time is sufficient to produce an article of silicon carbide having a density of greater than about 90% theoretical density.

* * * * *